United States Patent
Ravikumar

(10) Patent No.: US 7,363,927 B2
(45) Date of Patent: *Apr. 29, 2008

(54) REMOVABLE BLOOD VESSEL OCCLUSION DEVICE

(75) Inventor: Sundaram Ravikumar, Briarcliff Manor, NY (US)

(73) Assignee: Arvik Enterprises, LLC, Dobbs Ferry, NY (US)

( * ) Notice: Subject to any disclaimer, the term of this patent is extended or adjusted under 35 U.S.C. 154(b) by 415 days.

This patent is subject to a terminal disclaimer.

(21) Appl. No.: 10/647,408

(22) Filed: Aug. 25, 2003

(65) Prior Publication Data

US 2004/0147951 A1 Jul. 29, 2004

(51) Int. Cl.
*A61B 17/00* (2006.01)
*A61M 29/00* (2006.01)

(52) U.S. Cl. .................. 128/887; 606/191
(58) Field of Classification Search ............... None
See application file for complete search history.

(56) References Cited

U.S. PATENT DOCUMENTS

| | | | |
|---|---|---|---|
| 3,626,947 A | 12/1971 | Sparks | 128/334 |
| 3,958,557 A | 5/1976 | Sharp et al. | 128/1 |
| 4,007,743 A * | 2/1977 | Blake | 606/232 |
| 4,365,621 A * | 12/1982 | Brundin | 128/831 |
| 4,852,568 A | 8/1989 | Kensey | 128/325 |
| 5,042,161 A | 8/1991 | Hodge | 33/501.45 |
| 5,133,724 A | 7/1992 | Wilson, Jr. et al. | 606/151 |
| 5,192,301 A * | 3/1993 | Kamiya et al. | 606/213 |
| 5,282,812 A | 2/1994 | Suarez, Jr. | 606/158 |
| 5,283,063 A | 2/1994 | Freeman | |
| 5,423,777 A | 6/1995 | Tajiri | |
| 5,425,757 A | 6/1995 | Tiefenbrun et al. | 623/2 |
| 5,447,515 A | 9/1995 | Robicsek | 606/158 |
| 5,645,565 A | 7/1997 | Rudd et al. | 606/213 |
| 5,656,036 A | 8/1997 | Palmaz | 623/12 |
| 5,725,551 A | 3/1998 | Myers et al. | 606/213 |
| 5,728,133 A | 3/1998 | Kontos | 606/213 |
| 5,733,329 A | 3/1998 | Wallace et al. | 623/1 |
| 5,755,779 A | 5/1998 | Horiguchi | 623/1 |
| 5,769,871 A * | 6/1998 | Mers Kelly et al. | 606/200 |
| 5,826,587 A | 10/1998 | Berenstein et al. | 128/898 |
| 5,879,366 A | 3/1999 | Shaw et al. | 606/213 |
| 5,925,060 A | 7/1999 | Forber | 606/191 |
| 5,928,266 A | 7/1999 | Kontos | 606/213 |
| 5,944,750 A | 8/1999 | Tanner et al. | 623/1 |
| 6,010,517 A | 1/2000 | Baccaro | 606/151 |
| 6,146,396 A | 11/2000 | Konya et al. | 606/159 |
| 6,179,857 B1 | 1/2001 | Diaz et al. | 606/194 |

(Continued)

*Primary Examiner*—Glenn K. Dawson
(74) *Attorney, Agent, or Firm*—Gordon & Jacobson, PC

(57) ABSTRACT

A blood vessel occluding device including a plug and an insertion device to temporarily occlude a blood vessel. In one embodiment, the plug has an axially symmetric shape and is made of a biocompatible material such as Silicone. The plug is inserted axially into the blood vessel and is gripped firmly by the walls of the blood vessel. A filament is attached to an inner surface of the plug. Pulling the filament exerts compressive force on the plug, causing the plug to collapse and facilitating the removal of the plug. The blood vessel occluding device allows the blood vessel to be occluded quickly and effectively. The insertion device is a spring loaded device that has a spring activated needle; this insertion device provides the axial force to insert the plug into the blood vessel.

9 Claims, 6 Drawing Sheets

U.S. PATENT DOCUMENTS

| | | | |
|---|---|---|---|
| 6,248,112 B1 | 6/2001 | Gambale et al. | 606/108 |
| 6,315,787 B1 | 11/2001 | Tsugita et al. | 606/213 |
| 6,409,739 B1 * | 6/2002 | Nobles et al. | 606/148 |
| 6,458,092 B1 | 10/2002 | Gambale et al. | 604/22 |
| 6,547,804 B2 | 4/2003 | Porter et al. | 606/195 |
| 6,579,311 B1 | 6/2003 | Makower | 623/1.23 |
| 6,746,468 B1 * | 6/2004 | Sepetka et al. | 606/200 |
| 6,896,692 B2 * | 5/2005 | Ginn et al. | 606/213 |
| 2003/0023267 A1 * | 1/2003 | Ginn | 606/213 |
| 2005/0209634 A1 * | 9/2005 | Brady et al. | 606/200 |

* cited by examiner

REMOVABLE BLOOD VESSEL OCCLUSION DEVICE

REFERENCE TO RELATED APPLICATIONS

This application is related to U.S. patent application Ser. No. 10/086,753 filed Mar. 1, 2002.

BACKGROUND

The present invention relates to medical devices that are implanted in the human body. In particular, the present invention relates to medical devices that can be used to occlude blood vessels.

Various implantable medical devices have been developed for treating ailments of the human body. One such implantable medical device is an occlusion device used to occlude blood vessels i.e. to prevent the flow of blood through these vessels. These occlusion devices may be used to occlude blood vessels either temporarily or permanently. In certain cases, for example, during a surgery, these devices may be used to stem the flow of blood while the surgery is performed. In other cases, such as in treatment of certain cardiovascular diseases, permanent occlusion devices may be used.

There are numerous situations where certain blood vessels such as arteries and veins may have to be occluded. In a typical surgical procedure various arteries and veins get cut and opened. The blood vessels that get exposed may begin to bleed profusely leading to life threatening situations. Hence, in such cases it is necessary to seal these cut blood vessels to prevent excessive loss of blood. In such cases, occluding means are often employed during the surgery to prevent excessive bleeding from such blood vessels.

A typical surgery requiring temporary occlusion of blood vessels is coronary artery bypass graft (CABG) surgery. This surgery is performed in specific situations involving blockage in a coronary artery. This is a very serious situation as the blockage affects the flow of blood in the artery and can lead to heart seizures. The affected region i.e. the region in which the blockage occurs is removed from the path of blood flow by providing a graft, which provides an alternate path for flow of blood. In a typical surgery, the surgeon cuts the affected artery. The affected region within the artery is incised and removed and the rest of the artery is joined by means of a graft. During the surgical procedure for grafting the incised portion of the artery is required to be occluded to prevent excessive bleeding.

Three techniques are usually employed to occlude blood vessels. These include sealing of a blood vessel using a finger, sealing of the blood vessel using a clamp or a clip and suturing of the blood vessel.

In the first technique that is the simplest, a surgeon or other person assisting in the surgery seals the cut blood vessel using a finger. This technique is usually used since the finger may be readily applied to seal the cut blood vessel. However, this method is usually not suitable due to certain drawbacks. Firstly, the space available in the site of the surgery may be reduced considerably. Secondly, the hand of the person may not allow the blood vessel to be clearly seen and operated upon, and hence this technique may hinder access to the site of the surgery. Because of these drawbacks, this technique is rarely used to occlude the affected blood vessels (for the entire duration of the surgery). Instead, this technique is sometimes used while another occluding mean is applied to the blood vessel.

In an alternative technique, a clamp or a clip may be used to occlude a blood vessel. In this technique, the clamp or clip is used to constrict the blood vessel so as to minimize blood flow through the narrow opening in the blood vessel. The surgical clamps and "ligating" clips come in a variety of shapes and sizes. In a typical design, a surgical clamp is connected to an elongated arm and is controlled with a handle. The elongated arm allows the surgeon to apply and remove the clamp easily during the surgery. Two such surgical clamps have been disclosed in U.S. Pat. Nos. 5,133,724 and 5,447,515. However, such designs are not always suitable since the long arm or handle may hinder the surgeon's access to the affected blood vessel. Also the clamps may not be very effective in occluding blood vessels with small diameter.

Alternative designs of clamps also exist where the handle or other such clamp applier may be readily removed from the site of the surgery. U.S. Pat. No. 5,282,812 discloses one such clamp. However, such a surgical clamp has the drawback that it is difficult to quickly loosen or remove the clamp. In this method, the difficulty arises since the surgeon must apply the appropriate amount of force by hand for loosening and removing the clamp. Another drawback of these occlusion devices is that these may not be effective in completely sealing certain blood vessels. For instance, a blood vessel such as an artery usually has a very thick wall. Therefore, it may not be possible to completely seal such an artery using a clamp or a clip. Furthermore, the clamps may slip and slide out of position if a sufficiently large clamping force is not applied. However, this large clamping force may permanently damage the wall of the artery. Thus, clamps and clips may not always be suitable for occluding blood vessels.

A third technique to occlude blood vessels is to suture these vessels. This technique allows the blood vessel to be completely sealed. However, suturing is usually a time-consuming procedure as compared to other methods mentioned above. Consequently, suturing may not be suitable for all surgical procedures. For instance, consider the surgical procedure used to treat an aneurysm in the lumbar region of the body. In this surgical procedure, a large number of blood vessels may need to be cut in order to treat the aneurysm. Hence, if the cut vessels are sutured, as is done currently, then there may be considerable loss of blood before all blood vessels have been occluded. Moreover, there may be difficulties in the suturing process itself if there are calcium deposits in the area of the aneurysm. Calcium deposits are likely to occur in this region since aneurysms usually begin as micro tears in the wall of the blood vessel, and calcium and other blood coagulating material are likely to deposit at the site of these tears. Furthermore, these calcium deposits may also weaken sutures that have been applied thereby decreasing the effectiveness of this technique. Also, if the sutures require to be removed then it is a time consuming and cumbersome process.

Consequently, there is a need to quickly and effectively occlude blood vessels during surgical procedures. Therefore, what is required is a sealing device capable of occluding a variety of blood vessels in different regions of the body.

SUMMARY

An object of the present invention is to provide a plug for temporarily occluding blood vessels.

In order to attain the aforementioned object, the present invention provides a plug made of biocompatible material and an insertion syringe to allow the plug to be inserted into the blood vessel. The plug is provided with a mechanism to allow the plug to be removed after the requirement for occluding the blood vessel is over. The present invention allows the blood vessel to be rapidly occluded and unoccluded as required.

Another object of the invention is to provide an apparatus for temporarily occluding blood vessels. The invention provides a plug to temporarily occlude the plug vessel, means for inserting the plug into the blood vessel and a mechanism to remove the plug from the blood vessel.

It is a further object of the present invention to provide a means to effectively occlude a blood vessel such as an artery. Accordingly, the plug of the present invention is designed to be effective even in cases of deposits, such as calcium and/or cholesterol deposits, in the artery.

In a preferred embodiment of the present invention, a plug having an essentially symmetric shape is provided. The first tapered body of the plug is attached to a disc shaped body; the disc shaped body is attached to a cylindrical body. The disc shaped body of the plug has diameter greater than the diameter of the lumen of the blood vessel. The larger diameter of the disc shaped body helps securing the plug in the blood vessel, thereby effectively occluding the blood vessel. The plug is provided with a mechanism which when activated causes the disc shaped body to collapse, thereby allowing the plug to be removed from the occluded blood vessel.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

During the course of a typical surgery, various blood vessels get cut. It is often required to occlude these blood vessels. Currently, sutures are used to occlude these blood vessels. However, this procedure is time consuming and leads to significant loss of blood before all the arteries have been occluded. Also, sutures may not be effective if there are calcium deposits in this region. Furthermore if a blood vessel has been occluded using sutures, then un-occluding the blood vessel will require removing the sutures. This may also lead to an overall increase in the time of the surgical operation.

The present invention provides a plug that may be used to quickly and effectively occlude and un-occlude blood vessels. The surgeon may use the plug to quickly seal the blood vessels thereby preventing excessive loss of blood. Thereafter the surgeon may carry on the required surgical procedure. After the surgical procedure is over or the need for occluding the blood vessel no longer exists, the surgeon can easily remove the plug.

Henceforth, the use of the plug has been exemplified in context of occluding an artery. However, a person skilled in the art would realize that the plug can also be used to occlude other blood vessels without deviating from spirit and scope of the invention. Furthermore the present invention may also be used to occlude vessels carrying other bodily fluids.

Figure 1:
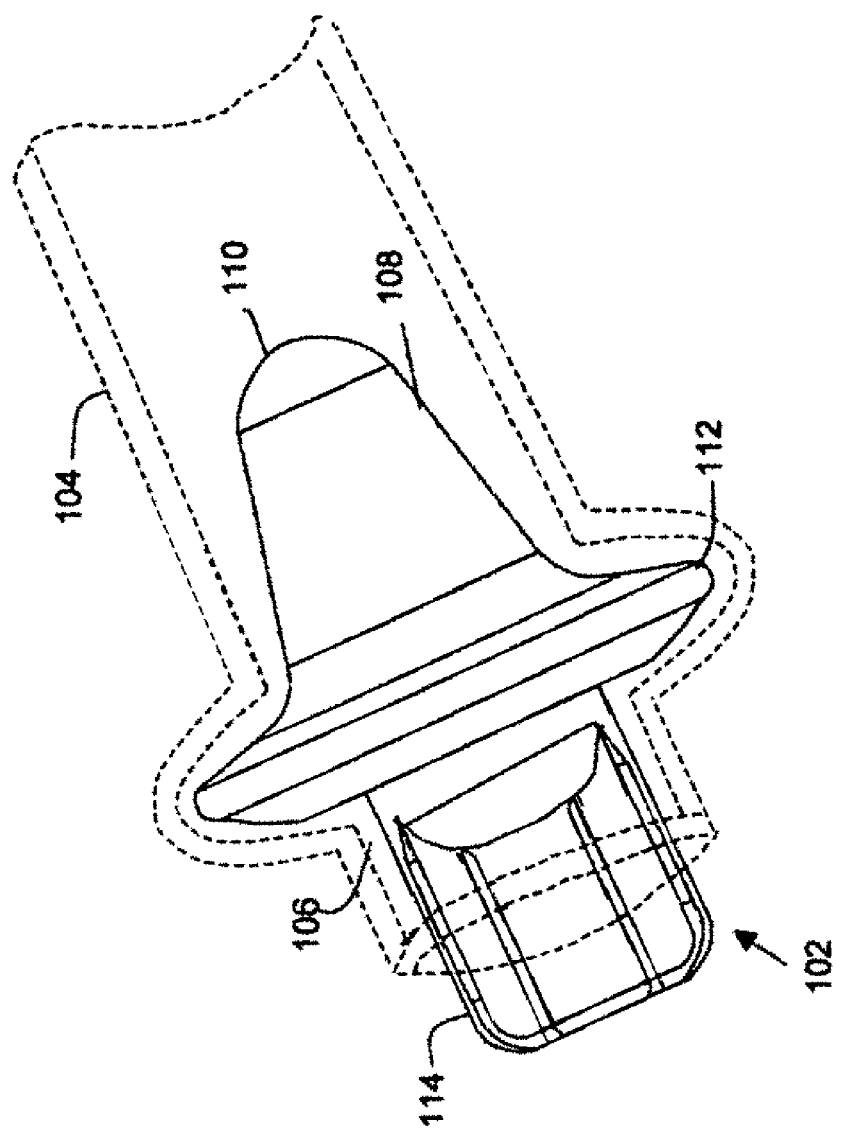
FIG. 1 shows an occlusion device inserted in a blood vessel in accordance with the present invention.

FIG. 1 illustrates an artery 104 that has been occluded using a plug 102 in accordance with the present invention. Artery 104 has a lumen 106 through which the blood flows and plug 102 has been inserted axially into lumen 106 to occlude artery 104. Plug 102 is axially symmetric and is inserted into blood vessel 104 such that the axis of symmetry of plug 102 coincides with the longitudinal axis of artery 104. Further, plug 102 comprises a first tapered body 108 having a rounded nose portion 110. Tapered body 108 is attached to a disc shaped body 110 which is attached to a cylindrical body 114. The diameter of tapered body 108 and cylindrical body 114 is less than the diameter of disc shaped body. The smallest diameter of tapered body 108 is less than the diameter of the lumen 106 and the diameter of disc shaped body 112 is larger than the diameter of lumen 106. This facilitates insertion of plug 102 into artery 104. The plug is inserted into the artery such that disc shaped body 112 is completely inserted and cylindrical body 114 is only partially inserted into the artery.

Artery 104 has a thick elastic wall surrounding lumen 106. This thick wall withstands the flow of blood at high pressure through artery 104. The elastic nature of artery 104 allows plug 102 to be tightly grasped by artery 104. The elastic nature of the artery walls enables the plug to be effective in occluding artery 104. Furthermore, the elastic walls of artery 104 also permit a small range of plugs 102 to be used for different sizes of arteries 104. Thus, plug 102 of a certain size may be used for occluding arteries of different sizes. Typically, plug 102 ranges from 1 mm to 4 mm in diameter.

In the preferred embodiment, plug 102 is made of silicone, which is a popular material for making devices that are implanted inside the body for long durations. Silicone is useful since it is non-toxic, chemically inert, substantially insoluble in blood and substantially non-immunogenic. In addition to silicone, newer elastomeric biocompatible materials may also be used to manufacture plug 102. Ongoing research and development in biocompatible materials have created materials with better strength and lower cost—all of which are desirable qualities of the material of plug 102. Typical examples of such materials include polyurethanes and polyisobutylene-based polymers.

Figure 2:
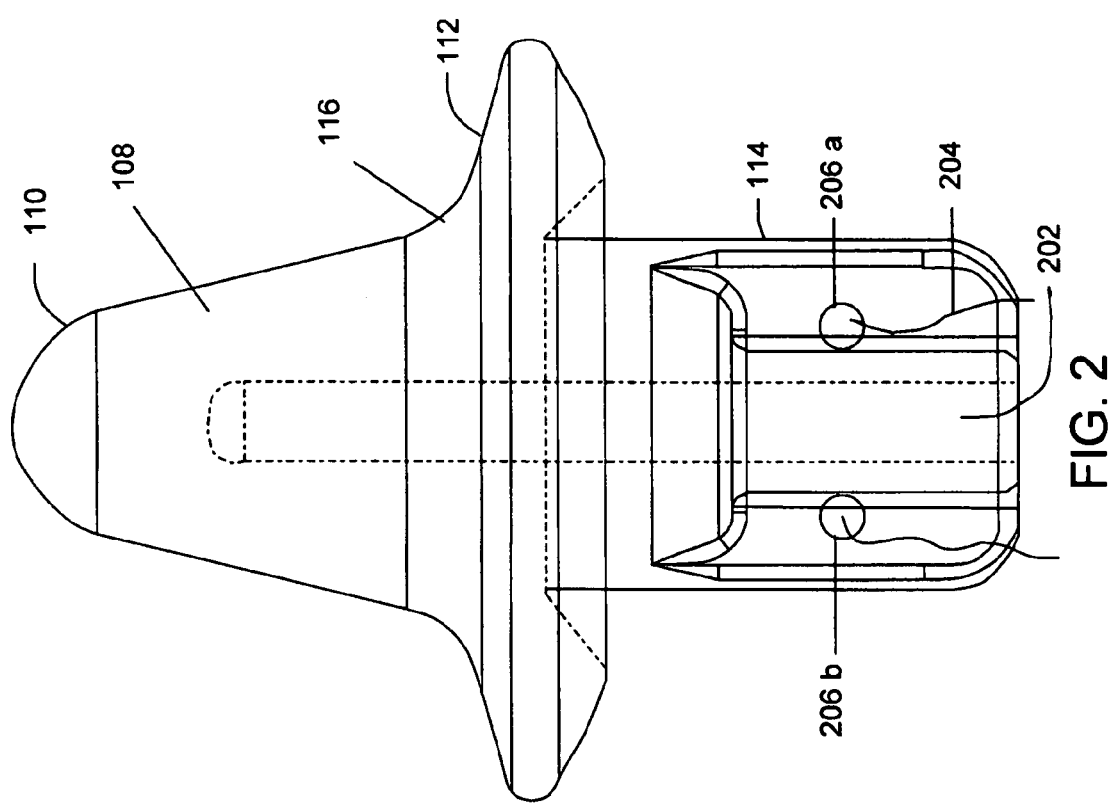
FIG. 2 shows a first preferred embodiment of the occlusion device.

FIG. 2 shows construction of plug 102 which is axially symmetric and substantially hollow. Plug 102 comprises tapered body 108 attached to second disc shaped body 112, which is in turn attached to a cylindrical body 114. The smallest diameter of tapered body 108 is less than the diameter of the lumen of blood vessel 104, and the largest diameter of tapered body 108 merges with the diameter of disc shaped body 112 by means of a curved transitional section 116. The diameter of disc shaped body 112 is greater than the diameter of the lumen of the artery. When plug 102 is inserted into the artery, the walls of the artery tightly grip the disc shaped body 112, thereby effectively occluding the artery. Disc shaped body 112 is attached to cylindrical body 114 which has a diameter that is less than the diameter of disc shaped body 112.

The walls of the artery exert compressive force on plug 102. Tapered body 108 facilitates the entry of plug 102 into the blood vessel. On inserting plug 102 into artery 104, tapered body 108 of the plug experiences a compressive force, which is exerted by the wall of the artery. Furthermore, it is also subject to an axial force due to pressure of blood in the artery. Similarly, disc shaped body 112 also experiences compressive force exerted by the walls of the artery, and axial force due to pressure of the blood in the artery. Disc shaped body 112 experiences the maximum comprehensive forces due to its larger diameter. Cylindrical body 114 may also experience compressive and axial forces. The effect of the forces will be more prominent on tapered body 108 and disc shaped body 112, cylindrical body 114 will experience relatively less force. The plug has sufficient strength to withstand the forces acting on it. The strength of the plug can be increased by various methods. A mode of internal construction of tapered body is 108 illustrated in FIG. 3. In addition, plug 102 has a longitudinally extending pilot hole 202 which enables plug 102 to be mounted on insertion syringe 400, shown in FIG. 4.

Plug 102 is a temporary plug and can be removed from the occluded blood vessel when desired. The plug may preferably be provided with a mechanism, which causes the plug to "collapse", thereby facilitating the removal of the plug from the occluded artery. As is evident from the above discussion, it is essentially the second disc shaped body, which is responsible for occluding the artery. The mechanism for collapsing the plug causes the second disc shaped body to fold or "collapse", thereby reducing the diameter of the plug; the plug can then be easily removed from the occluded blood vessel.

The inner surface of hollow disc shaped body 112 has a filament or thread 204 attached to it; the filament running along its inner circumference of the plug. Filament 204 may complete at least one round of the inner circumference of disc shaped body 112. The two ends of filament 240 protrude out of the plug from holes 206 a and 206 b in portion 114. The tread can be attached to the inner surface of disc shaped body 112 by means of grooves through with the filament passes. Also, disc shaped body 112 may have tunnels along its inner circumference. In case of tunnels, openings will be provided for inserting and removing the filament. Pulling the ends of filament 204, will cause filament 204 to exert a compressive force along the circumference of the plug, this force will result in a collapse of disc shaped body 112. Once body 112 has collapsed the diameter of plug 102 will be significantly reduced, allowing easy removal from the occluded blood vessel. Further pulling on filament 204 will cause plug 204 to be removed from the blood vessel. Nylon or silk thread may be used for this purpose. However a person skilled in the art will realize that filament of any other material of sufficient tensile strength may be used, without deviating from spirit and scope of the invention.

Figure 3:
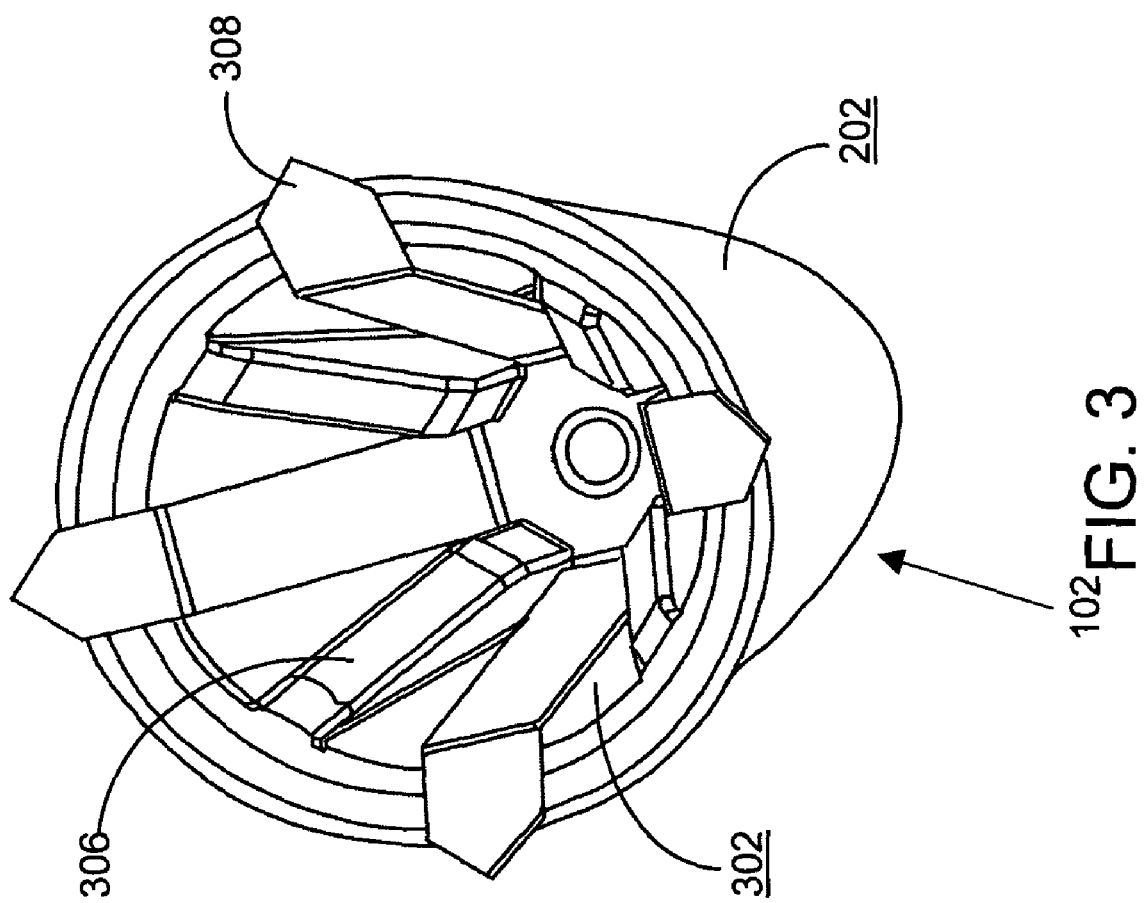
FIG. 3 shows the internal construction of the preferred embodiment of the occlusion device.
Figure 4:
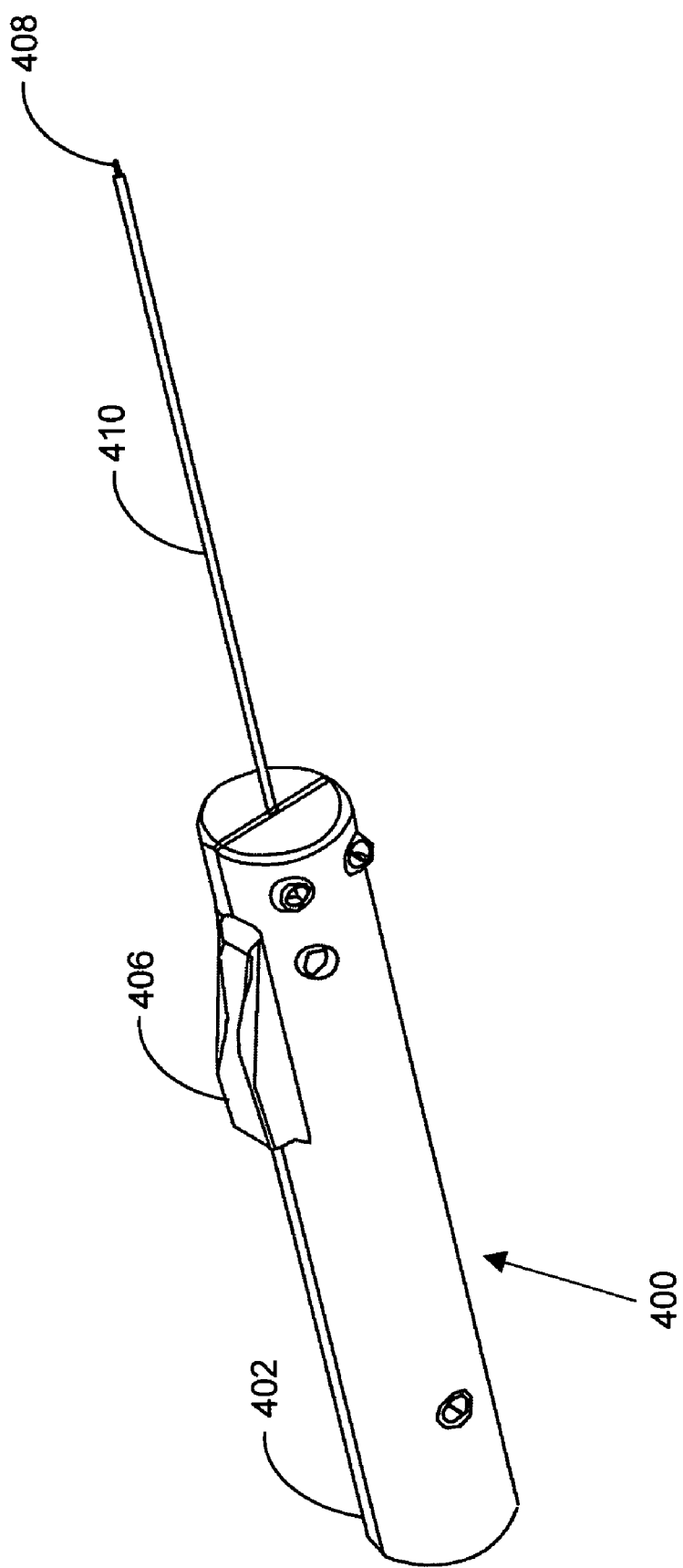
FIG. 4 shows the insertion device in accordance with the present invention.

FIG. 3 illustrates a preferred mode of internal construction of tapered body 108 of plug 102. To increase the strength of the tapered body, the inner surface 302 of plug 102 is corrugated and projections 306 are provided to add strength to plug 102. Further, plug 102 may be reinforced by means of a series of strengthening spokes 308 attached to inner surface 302. Spokes 308 are typically made of a metal such as tungsten or another material of sufficient rigidity and strength. In an alternative embodiment, plug 102 may be constructed without any reinforcing spokes 308. In this embodiment, plug 102 may be manufactured using materials of sufficient structural rigidity and strength. Furthermore, reinforcing spokes may be avoided by suitably increasing the thickness of plug 102. A person skilled in the art will realize that similar techniques can be used to get the required strength in the other portions of the plug including the second disc shaped body.

Figure 5:
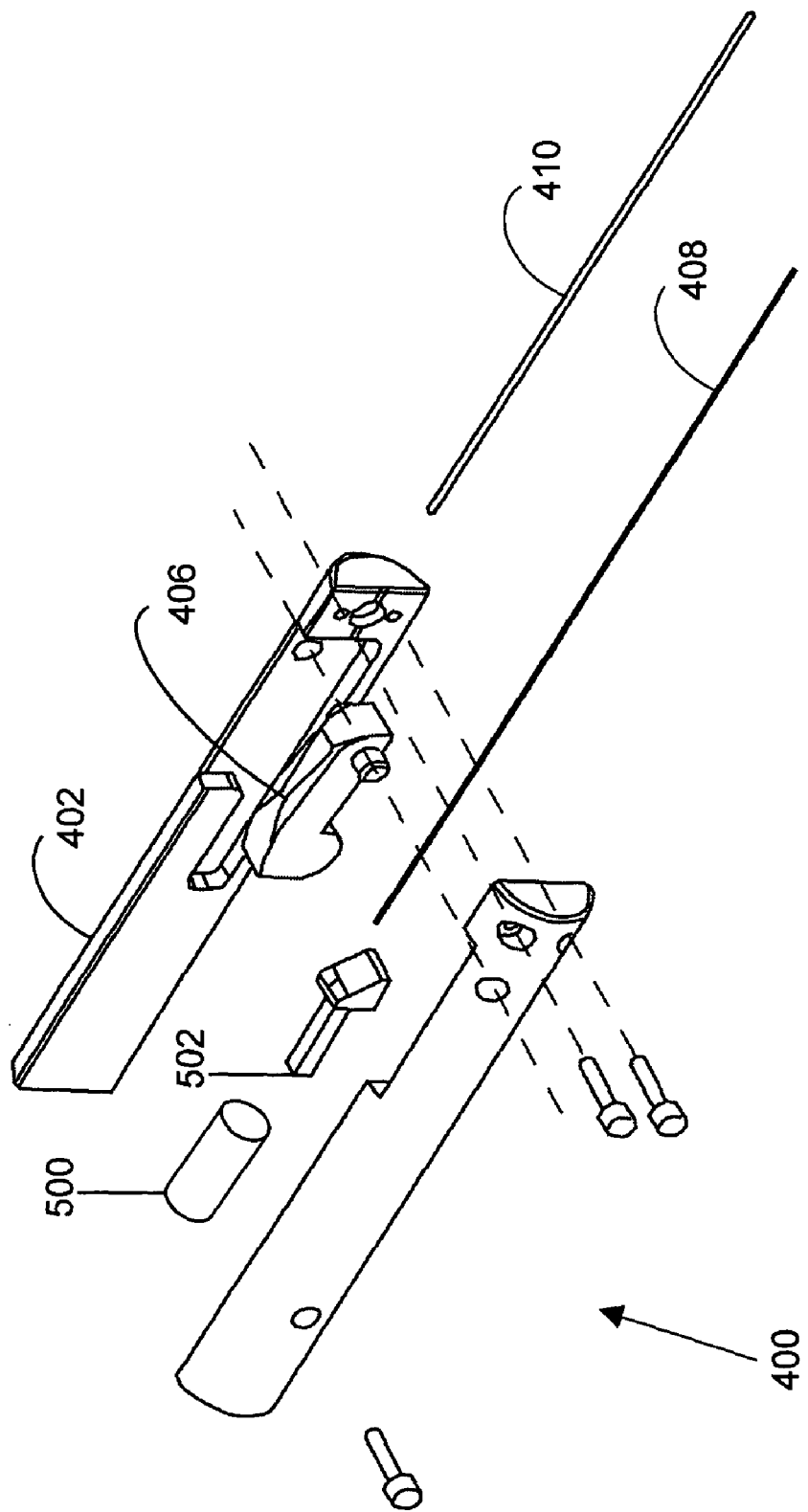
FIG. 5 shows an exploded view of the insertion device.

In a typical surgery, plug 102 is inserted into artery 104 by positioning the plug proximate, to severed artery 104, and by applying an axial force. The surgeon may apply this force either by hand (if feasible) or by using an insertion device such as the insertion syringe 400, shown in FIG. 4. Insertion syringe 400 has a casing 402 and a lever 406; the surgeon uses lever 406 to operate insertion syringe 400. Lever 406 in turn causes a needle 408, housed in a tubular needle guard 410, to be pushed outwards. To insert the plug, the surgeon mounts plug 102 on needle guard 410 of insertion syringe 400. This is done by positioning needle guard 410 such that it fits snugly into pilot hole 202 of plug 102. Next, the surgeon aligns artery 104 and plug 102, and uses lever 406 to provide an axial force on needle 408 to insert plug 102 into artery 104. FIG. 5 shows an exploded view of insertion syringe 400 which is essentially a spring-activated device. A spring 500 and a needle guide 502 have been shown disposed in casing 402. Spring 500 is in compressed before lever 406 is activated, and needle 408 is pulled inside needle guard 410. Once lever 406 is activated, spring 500 extends and propels needle guide 502; in turn, needle guide 502 propels needle 408 outwards. Hence, plug 102 that is attached to needle guard 410 is propelled outwards and inserted into artery 104. It will be apparent to one skilled in the art that alternative ways to propel the needle may be employed in insertion syringe 400. For instance, needle 408 of insertion syringe 400 could be propelled outwards using air or other fluid means at high pressure.

Figure 6:
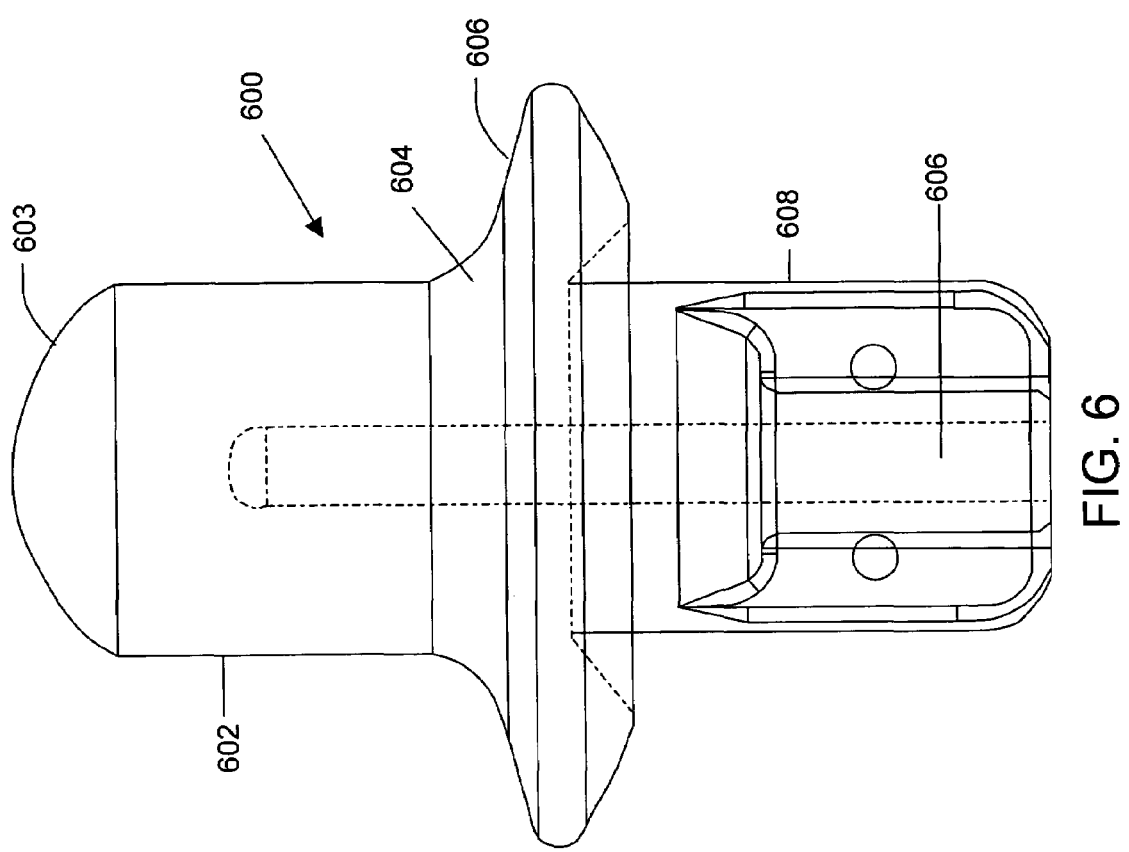
FIG. 6 shows a second preferred embodiment of the occlusion device.

FIG. 6 shows a second preferred embodiment 600 of the present invention used to occlude artery 104. Plug 600 is also symmetric about its axis and comprises a first cylindrical (rather than tapered) body 602 having a rounded forward end 603. The first cylindrical body has diameter less than the diameter of the lumen of artery 104, this facilitates introduction of plug 600 into artery 104. Tubular section 602 of plug 600 is joined to a disc shaped body 606 having a larger diameter than that of tubular section 602 by means of a curved transitional section 604. The diameter of disc shaped body 606 is arranged to be larger than that of the lumen of the artery. On insertion of plug 600, the walls of artery 104 will wrap around disc shaped body 606 and third cylindrical body 608 of plug 600. In this plug, the diameter of rounded end 603 and diameter of tubular section 602 are slightly less than diameter of lumen 106 of artery 104. Consequently, the insertion of the plug is facilitated into artery 104. Following disc shaped body 606 is third cylindrical body 608 having a pilot hole 610. Pilot hole 610 allows plug 600 to be used in conjunction with insertion syringe 400 thereby enabling plug 600 to be quickly applied to occlude artery 104. Plug 600 is also made of a biocompatible material such as Silicone and the like. The same filament "collapsing" mechanism as described in conjunction with the first preferred embodiment is used to remove the plug from the artery.

In another alternative embodiment, the third cylindrical body of the plug 200 may be eliminated. Instead, a hole may be provided at the base of the second disc shaped body for receiving the filament attached to the inner circumference of the second disc shaped body.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. An apparatus for occluding a blood vessel lumen, said apparatus for use with an insertion device, said apparatus comprising:
   an integral occluding body realized from an elastomeric polymer, said integral occluding body consisting essentially of a blunt distal tip, a frusto-conical portion extending proximally from said distal tip, a disc-shaped portion extending proximally from said frusto-conical portion, and a proximal portion extending proximally from said disc-shaped portion, the diameter of the disc-shaped portion being larger than the diameter of the frusto-conical portion and adapted to be larger than the diameter of the blood vessel lumen in its natural state, the diameter of the proximal portion being smaller that the diameter of the disc-shaped portion;
   wherein, when the occluding body is inserted by the insertion device axially into the blood vessel lumen, the wall of the lumen of the blood vessel expands and grasps the disc-shaped portion thereof such that the occluding body blocks blood flow through the blood vessel lumen; and
   wherein at least said proximal portion defines a pilot hole for receiving the insertion device and said proximal portion defines means for receiving retraction means for removal of the occluding body from the blood vessel lumen.

2. An apparatus according to claim 1, further comprising:
   a recess in said disc-shaped portion, said recess disposed adjacent said proximal portion.

3. An apparatus according to claim 1, wherein:
   said disc-shaped portion and said frusto-conical portion further define said pilot hole.

4. An apparatus according to claim 1, wherein:
   said proximal portion comprises a cylindrical body.

5. An apparatus according to claim 1, further comprising:
   said retraction means for removal of the occluding body from the blood vessel lumen, wherein said retraction means comprises at least one filament.

6. An apparatus according to claim 1, wherein:
   the elastomeric polymer of the integral occluding body is selected from the group consisting of silicone, polyurethane and polyisobutylene-based polymers.

7. An apparatus according to claim 1, wherein:
   said disc-shaped portion has a diameter in the range between 1 mm and 4 mm.

8. An apparatus according to claim 1, further comprising:
   said insertion device for inserting the integral occluding body axially into the blood vessel lumen, said insertion device having a needle that is operably disposed within said pilot hole.

9. An apparatus according to claim 8, wherein:
   said insertion device includes at least one of
   i) a tubular needle guard surrounding the needle, the tubular needle guard fitting into the pilot hole of the occluding body,
   ii) a spring connected to the needle to propel the needle outwards and to thereby urge the occluding body into the blood vessel lumen, and
   iii) a lever operable to propel the needle outwards to thereby urge the occluding body into the blood vessel lumen.

* * * * *